United States Patent
Conroy et al.

(10) Patent No.: US 8,169,366 B2
(45) Date of Patent: May 1, 2012

(54) RECONFIGURABLE SATELLITE POSITIONING SYSTEM RECEIVERS

(75) Inventors: Cormac S. Conroy, Campbell, CA (US); Leonid Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 12/395,439

(22) Filed: Feb. 27, 2009

(65) Prior Publication Data

US 2010/0127925 A1    May 27, 2010

Related U.S. Application Data

(60) Provisional application No. 61/117,857, filed on Nov. 25, 2008.

(51) Int. Cl.
G01S 19/24 (2010.01)
G01S 19/42 (2010.01)
G01S 19/36 (2010.01)

(52) U.S. Cl. .......... 342/357.63; 342/357.25; 342/357.76

(58) Field of Classification Search ............ 342/357.25, 342/357.46, 357.63, 357.67, 357.76; 701/207, 701/213, 215
See application file for complete search history.

(56) References Cited

U.S. PATENT DOCUMENTS

| | | | |
|---|---|---|---|
| 5,450,448 A * | 9/1995 | Sheynblat | 375/346 |
| 5,777,580 A * | 7/1998 | Janky et al. | 342/457 |
| 7,286,592 B2 | 10/2007 | Pietila et al. | |
| 7,295,925 B2 * | 11/2007 | Breed et al. | 701/301 |
| 7,859,453 B2 * | 12/2010 | Rowitch et al. | 342/357.29 |
| 2003/0179132 A1 * | 9/2003 | Loh et al. | 342/357.02 |
| 2007/0274374 A1 | 11/2007 | Abraham | |
| 2008/0119157 A1 | 5/2008 | Watanabe | |

OTHER PUBLICATIONS

International Search Report and the Written Opinion—PCT/US2009/065771, International Search Authority—European Patent Office—Mar. 26, 2010.

* cited by examiner

*Primary Examiner* — Dao Phan
(74) *Attorney, Agent, or Firm* — Thien T. Nguyen

(57) ABSTRACT

Methods and apparatus are provided for operatively enabling at least a first receiver path to receive a first signal associated with a first satellite positioning system (SPS), operatively enabling at least a second receiver path to receive a signal associated with at least one other SPS, and subsequently operatively enabling at least the second receiver path to receive a second signal associated with the first SPS.

46 Claims, 4 Drawing Sheets

RECONFIGURABLE SATELLITE POSITIONING SYSTEM RECEIVERS

RELATED APPLICATIONS

This patent application claims benefit of and priority to U.S. Provisional Patent Application 61/117,857, filed Nov. 25, 2008, and titled "Reconfigurable Satellite Positioning System Receivers", and which is incorporated in its entirety by reference herein.

BACKGROUND

1. Field

The subject matter disclosed herein relates to electronic devices and, and more particularly to methods and apparatuses for use in devices having a plurality of satellite positioning system (SPS) receiver paths or the like.

2. Information

Wireless communication systems are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity between a plethora of devices, both fixed and portable. Many of these wireless systems are coupled together through other communication systems and resources to promote even more communication and sharing of information. Indeed, it is not uncommon for some devices to be enabled to communicate with more than one wireless communication system and this trend appears to be growing.

Another popular and increasingly important wireless technology includes navigation systems and in particular satellite positioning systems (SPS) such as, for example, the global positioning system (GPS) and other like Global Navigation Satellite Systems (GNSS) for example, Galileo, Glonass, Compass/Beidou, QZSS, etc. An SPS receiver path, for example, may receive wireless SPS signals that are transmitted by a plurality of orbiting satellites of a GNSS. The SPS signals once received may be processed, for example, to determine a global time, an approximate geographical location, altitude, and/or speed associated with a device having the SPS receiver path.

SUMMARY

Methods and apparatus are provided that may be implemented, for example, to operatively enable at least a first receiver path to receive a first signal associated with a first satellite positioning system (SPS), operatively enable at least a second receiver path to receive a signal associated with at least one other SPS, and subsequently operatively enable at least the second receiver path to receive a second signal associated with the first SPS In accordance with certain exemplary aspects, a method may be provided which includes operatively enabling at least a first receiver path to receive a first signal associated with a first SPS, operatively enabling at least a second receiver path to receive a signal associated with at least one other SPS, and subsequently operatively enabling at least said second receiver path to receive a second signal associated with the first SPS.

In accordance with other exemplary aspects, an apparatus may be provided which includes a plurality of receiver paths, and a controller operatively coupled to the plurality of receiver paths and operatively enabled to: (i) operatively enable at least a first receiver path to receive a first signal associated with a first SPS, (ii) operatively enable at least a second receiver path to receive a signal associated with at least one other SPS, and (iii) selectively operatively enable at least said second receiver path to receive a second signal associated with said first SPS.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

There are several navigation systems, such as, for example, satellite positioning systems (SPS), currently available for use by applicably configured devices. For example, certain devices may be configured for use with the global positioning system (GPS), while other devices may be configured for use with another Global Navigation Satellite System (GNSS). The availability of signals from one or more SPS or GNSS may differ depending on several considerations such as location. Hence, it may be beneficial to have a device that can adapt, as needed, to utilize available SPS signals.

With this in mind, methods/processes and apparatus are provided herein for enabling at least a first receiver path to receive a first signal associated with a first satellite positioning system (SPS), enabling at least a second receiver path to receive a signal associated with at least one other SPS, and subsequently enabling at least the second receiver path to receive a second signal associated with the first SPS.

Figure 1:
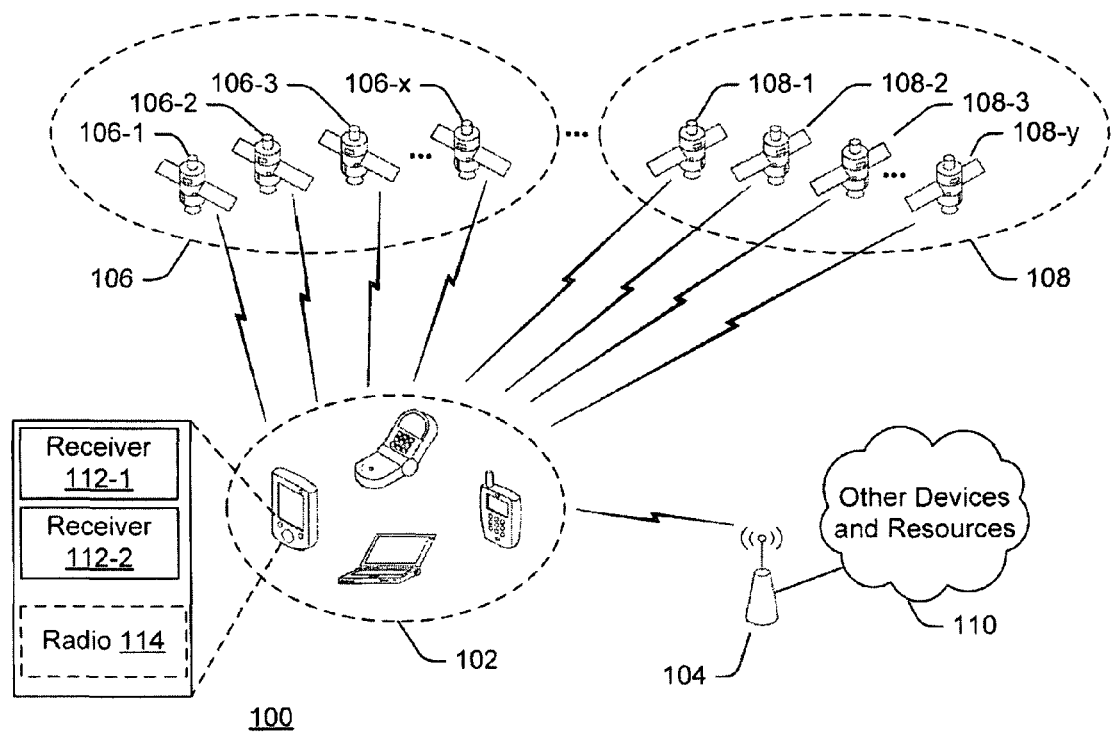
FIG. 1 is block diagram illustrating an environment that includes a device with at least one satellite positioning system (SPS) interface having a plurality of adaptable receivers in accordance with certain exemplary implementations.

FIG. 1 is a block diagram illustrating a wireless environment 100 that may include various computing and communication resources enabled to provide at least some form of navigation services in accordance with certain exemplary implementations of present description.

By way of example but not limitation, in some of the examples presented herein a device 102 may include a plurality of receivers 112 which are individually enabled to receive a particular wireless signal associated with one of a plurality of navigation systems, such as, for example, a first satellite positioning system (SPS) 106 and a second SPS 108.

In certain implementations wireless environment 100 may further include various computing and communication resources enabled to provide communication and/or other information processing services with respect to device 102. Thus, for example, wireless environment 100 may be representative of any system(s) or a portion thereof that may include at least one device 102 enabled to transmit and/or receive wireless signals to/from at least one wireless communication system 104.

Device 102 may, for example, include a mobile device or a device that while movable is primarily intended to remain stationary. Thus, as used herein, the terms "device" and "mobile device" may be used interchangeable as each term is intended to refer to any single device or any combinable group of devices that may transmit and/or receive wireless signals.

By way of example but not limitation, as illustrated using icons in FIG. 1, device 102 may include a mobile device such as a cellular phone, a smart phone, a personal digital assistant, a portable computing device, a navigation unit, and/or the like or any combination thereof. In other exemplary implementations, device 102 may take the form of a machine that is mobile or stationary. In still other exemplary implementations, device 102 may take the form of one or more integrated circuits, circuit boards, and/or the like that may be operatively enabled for use in another device.

Regardless of the form of device 102, device 102 may include at least two receivers 112-1 and 112-2 wherein each of the receivers may be selectively enabled to receive particular signals. In certain implementations, receivers 112-1 and 112-2 may operate concurrently. The terms "receiver" and "receiver path" as used herein, and may be interchangeable as each may refer to any circuitry and/or the like that may be selectively enabled to at least receive signals associated with two or more satellite positioning systems. The signals to be received may be transmitted at the same or different carrier frequencies, frequency bands, and/or frequency channels (e.g., within a frequency band). The signals to be received may be transmitted using the same or different modulation, coding, or other like techniques for transmitting information. In certain implementations, two or more receivers and/or receiver paths may be enabled to share a portion of circuitry and/or the like (e.g., a processing unit, memory, antenna, etc.).

By way of example but not limitation, in some of the examples presented herein device 102 may include a radio 114 that is enabled to receive and/or transmit wireless signals associated with at least one wireless communication system 104 (e.g., a wireless telephone system, a wireless local area network, personal area network, and/or the like). In certain implementations, device 102 may only be enabled to receive wireless signals from wireless communication system 104, while in other implementations device 102 may only be enabled to transmit wireless signals to wireless communication system.

As illustrated in FIG. 1, wireless communication system 104 may be enabled to communicate with and/or otherwise operatively access other devices and/or resources as represented simply by cloud 110. For example, cloud 110 may include one or more communication devices, systems, networks, or services, and/or one or more computing devices, systems, networks, or services, and/or the like or any combination thereof.

Wireless communication system 104 is representative of any wireless communication system or network that is enabled to receive and/or transmit wireless signals. By way of example but not limitation, wireless communication system 104 may include a wireless wide area network (WWAN), a wireless local area network (WLAN), a wireless personal area network (WPAN), a Bluetooth communication system, WiFi communication system, Global System for Mobile communications (GSM) system, Evolution Data Only/Evolution Data Optimized (EVDO) communication system, Ultra Mobile Broadband (UMB) communication system, Long Term Evolution (LTE) communication system, Mobile Satellite Service-Ancillary Terrestrial Component (MSS-ATC) communication system, and/or the like.

The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Such location determination techniques described herein may also be used for any combination of WWAN, WLAN and/or WPAN.

Device 102 may be enabled to at least receive wireless signals from at least two navigation systems which are illustrated in FIG. 1 by first SPS 106 having a plurality of SPS signal transmitting satellites 106-1, 106-2, 106-3, . . . , 106-$x$, and second SPS 106 having a plurality of SPS signal transmitting satellites 108-1, 108-2, 108-3, . . . , 108-$y$. Those skilled in the art will recognize that either SPS 106 and/or SPS 108 may include additional transmitting and/or other supporting resources in addition to or instead of the satellites as illustrated.

The satellites of SPS 106 and/or SPS 108 may each be enabled to transmit a unique SPS signal of which, at least a portion may be received by device 102 and used in some manner for navigation, for example, to determine a time, a range, a location, a position, etc. Specific navigation signaling and location determining techniques may vary depending on the navigation system(s) being used.

An SPS may include a system of transmitters positioned to enable entities to determine their location on the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellites as illustrated in FIG. 1. For example, a satellite in a constellation of Global Navigation Satellite System (GNSS) such as Global Positioning System (GPS), Galileo, Glonass or Compass may transmit a signal marked with a PN code that is distinguishable from PN codes transmitted by other satellites in the constellation.

To estimate its location, device 102 may determine pseudorange measurements to satellites that are "in view" of its receiving radio using well known techniques based, at least in part, on detections of PN codes in signals received from the satellites. Such a pseudorange measurement to a satellite may be determined based, at least in part, on a code phase detected in a received signal marked with a PN code associated with the satellite during a process of acquiring the received signal at the receiving radio. To acquire the received signal, device 102 may, for example, be enabled to correlate the received signal with a locally generated PN code associated with a satellite. For example, device 102 may correlate such a received signal with multiple code and/or time shifted versions of such a locally generated PN code. Detection of a particular time and/or code shifted version yielding a correlation result with the highest signal power may indicate a code phase associated with the acquired signal for use in measuring pseudorange as discussed above.

Thus, in certain implementations, device 102 may be enabled to determine its location in such a manner or other like manner without additional support from other devices. In other implementations, however, device 102 may be enabled to operate in some manner with one or more other devices to determine its location and/or to support other navigation related operations. Such navigation techniques are also well known.

In certain implementations, device 102 may be enabled to receive SPS signals from two or more GNSS, such as, for example, GPS, Galileo, GLONASS, Compass, or other like systems that use satellites from a combination of these systems, or any SPS developed in the future, each referred to generally herein as a SPS. As used herein, an SPS will also be understood to include pseudolite systems and/or other like assisted or enhanced SPS.

Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "signal", as used herein with regard to an SPS, may include SPS-like signals from pseudolites, equivalents of pseudolites, and/or the like.

Receivers 112-1 and 112-2 of device 102 may be selectively enabled to receive selected signals via one or more operating modes. For example, receiver 112-1 may be selectively enabled per a first operating mode to receive a particular signal from SPS 106 while receiver 112-2 may be selectively enabled per a second operating mode to receive a particular signal from SPS 108. By enabling (e.g., configuring) the receivers in such a manner, it may be possible to determine or otherwise identify which signals may be available and/or useful to device 102. For example, in certain implementations device 102 may be configured to attempt to receive various signals from a plurality of different SPS using a plurality of correspondingly enabled receivers. Such an attempt may allow device 102 to subsequently select one or more particular SPS for continued and/or additional signal reception. Thus, in the example above, if receiver 112-1 receives a first signal from SPS 106 and receiver 112-2 does not receive a signal from SPS 108, then device 102 may select SPS 106 for continued and/or additional signal reception and as such receiver 112-2 may be subsequently enabled to receive a second signal from SPS 106. Here, the second signal may be a second received version of the first signal (e.g., multipath) or a different signal. For example, the second signal may be different from the first signal in that the second signals is associated with a different frequency band, a different frequency channel, and/or the like.

Subsequent adaptation of receiver 112-2 may, for example, be in accordance with a third operating mode. Here, for example, additional signals from SPS 106 transmitted over a different frequency band or frequency channel may allow for improved signal reception and/or otherwise support improved navigation capabilities. In another example, receiver 112-2 may be subsequently enabled to receive a signal from SPS 106 with at least one different antenna, antenna element, antenna adaptation, and/or the like, than that which may be associated with receiver 112-1. Here, for example, the resulting antenna diversity may allow for improved reception of a signal or signals from SPS 106.

Figure 2:
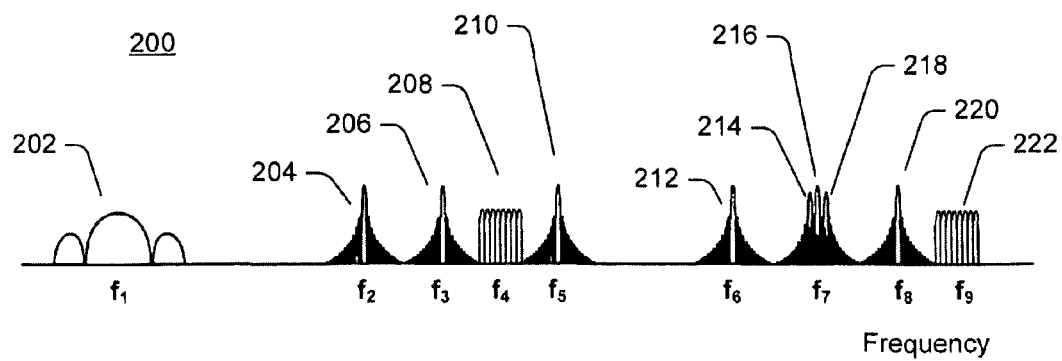
FIG. 2 is an illustrative graph showing some exemplary spectra associated with various satellite positioning system (SPS) signals that may, for example, be suitable for reception by the device in FIG. 1.

FIG. 2 is a graph 200 illustrating different spectra representative of a plurality of wireless signal transmissions associated with various exemplary SPS as represented by existing and/or planned Global Navigation Satellite Systems (GNSS). In the non-exhaustive examples shown in graph 200, various different types of spectra are illustrated as being centered or otherwise associated with a carrier or center frequency ($f_n$) that may be defined according to a specified standard, frequency band and/or channel associated with a frequency band. Those skilled in the art will recognize that the spectra in FIG. 2 as well as the various frequencies are intended to be illustrative only and is not intended by shape, placement, and/or size to represent actual waveforms, communication schemes or techniques, etc., and/or to otherwise limit in some manner the scope of the subject matter claimed herein.

Thus, with reference to graph 200 and by way of example but not limitation SPS signals 332 and/or 334, may include GNSS signals such as GPS L1C band signals (represented by spectrum 216, wherein $f_7 \approx 1575.42$ MHz), GPS L2C band signals (represented by spectrum 206, wherein $f_3 \approx 1227.60$ MHz), GPS L5 band signals (represented by spectrum 202, wherein $f_1 \approx 1176.45$ MHz), Galileo L1F band signals (represented by spectrum 216, wherein $f_7 \approx 1575.42$ MHz), Galileo E5A band signals (represented by spectrum 202, wherein $f_1 \approx 1176.45$ MHz), Glonass L1 band signals (represented by spectrum 222, wherein $f_9 \approx 1601$ MHz), Glonass L2 band signals (represented by spectrum 208, wherein $f_4 \approx 1246$ MHz), Compass (Beidou) L1 band signals (represented by spectrum 212, wherein $f_6 \approx 1561$ MHz, and spectrum 220, wherein $f_8 \approx 1590$ MHz), Compass (Beidou) L2 band signals (represented by spectrum 204, wherein $f_2 \approx 1207$ MHz, and spectrum 210, wherein $f_5 \approx 1268$ MHz), and/or the like (e.g., one or more QZS signals, etc.).

As illustrated in FIG. 2, the various SPS signals are distributed over a variety of frequencies. Accordingly, selectively switching the SPS receiver between such SPS signals may allow for device 102 to avoid or otherwise reduce SPS signal interference. Also, as illustrated in FIG. 2 by the differing illustrative shapes of spectra, different transmission techniques may be employed by different GNSS and/or at different frequency bands and/or channels. For example, Glonass signals are frequency division multiplexed and hence are illustrated with differently shaped spectra than are the GPS or other like code division multiplexed signals. Such techniques are well known.

Figure 3:
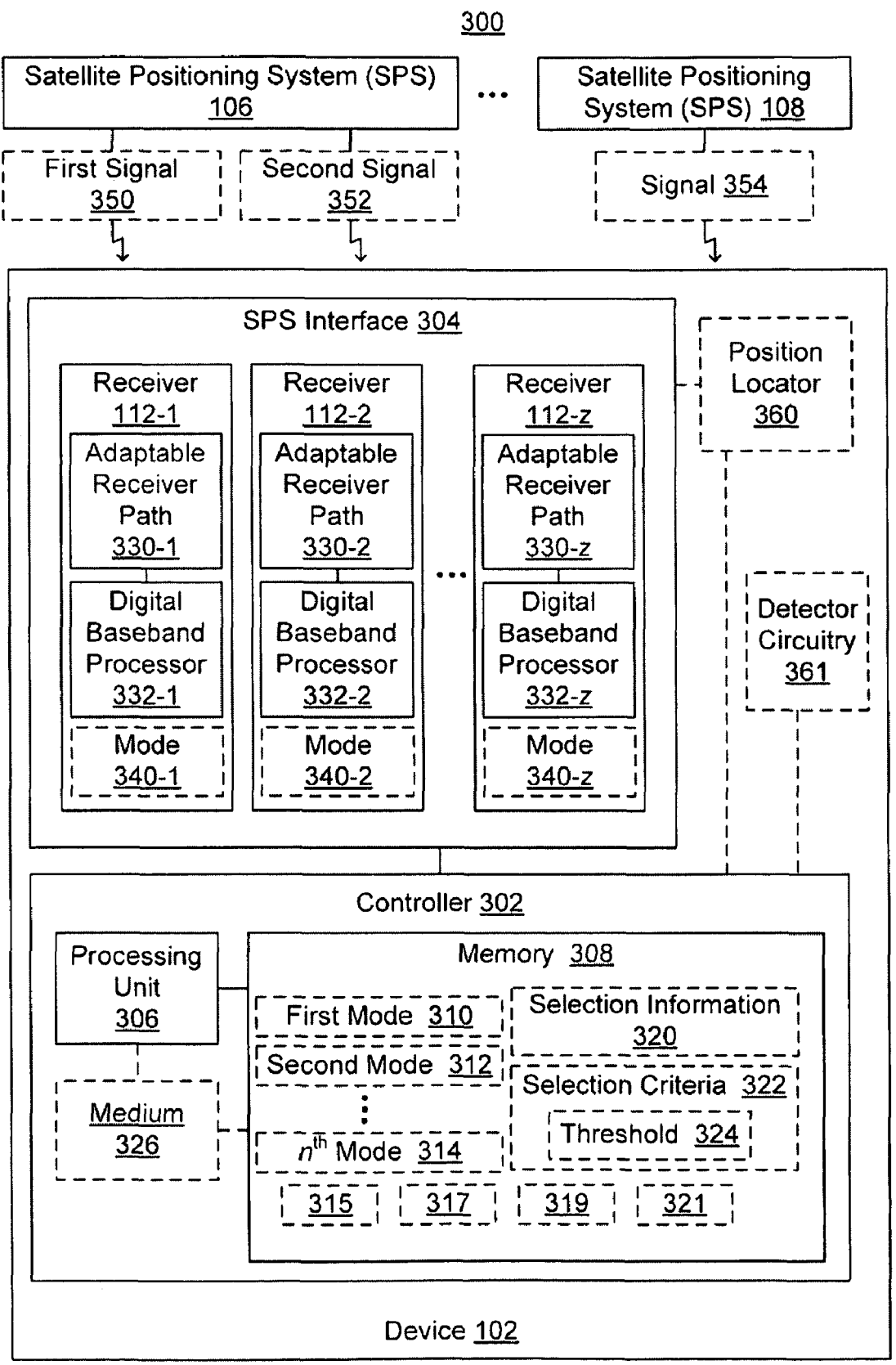
FIG. 3 is a block diagram illustrating certain features of an exemplary device having an SPS interface that may, for example, be implemented in the environment of FIG. 1.

Reference is now made to FIG. 3, which is a block diagram depicting an exemplary system 300 that may, for example, be enabled for use in environment 100. System 300 may include device 102, SPS 106 and SPS 108.

As shown, device 102 may include a controller 302 that is operatively coupled to an SPS interface 304. Controller 302 may, for example, include at least one processing unit 306 that may be operatively coupled to memory 308. While illustrated in this example using a processing unit and memory, controller 302 may be representative of any hardware, firmware, software and/or combination thereof that may be configured to perform functions associated with selectively enabling two or more receivers that may be provided within SPS interface 304. For example, in certain other implementations the functionality of processing unit 306 and memory 308 may be combined and provided using combinatorial logic, an ASIC, or the like.

In this example processing unit 306 may be configured to selectively adapt receivers 112 within SPS interface 304 based on a plurality of operating modes that may be identified, for example, in memory 308 and/or otherwise established. For example, information and/or instructions associated with a first mode 310, a second mode 312, . . . , and an $n^{th}$ mode 314 may be stored in memory 308. For example, first mode 310 may include information and/or instructions that may be used to adapt a receiver 112 to receive a first signal 350 associated with SPS 106, second mode 312 may include information and/or instructions that may be used to adapt a receiver 112 to receive a second signal 352 associated with SPS 106, and $n^{th}$ mode 314 may include information and/or instructions that may be used to adapt a receiver 112 to receive a signal 354 associated with SPS 108. Such information and/or instructions may, for example, vary depending on the design of SPS interface 304, controller 302, SPS 106, SPS 108, and/or other resources of system 300. By way of example, in certain exemplary implementations, first mode 310 may specify and a particular SPS (e.g., GNSS) and if needed a frequency, a frequency band, and/or a frequency channel that the receiver should be enabled to receive. Thus, processing unit 306 may, for example, adapt a receiver 112 per a mode 340 based, at least in part, on at least one operating mode in memory 308.

Processing unit 306 may, for example, adapt a receiver 112 per a mode 340 based, at least in part, on selection information 320 and/or selection criteria 322. Such selection information 320 and/or selection criteria 322 may, for example, be stored in memory 308 as illustrated in FIG. 3. Selection information 320 may, for example, include information associated with one or more signals that may have been received by SPS interface 304. For example, selection information 320 may include information identifying that a signal has been received, information associated with a signal strength of a received signal, information associated with a signal quality of a received signal, information associated with a number of satellites or the like from which signals have been received, and/or other like information. Such selection information may, for example, be provided by one or more receivers 112 and/or portions thereof, and/or a position locator 360. Selection information 320 may, for example, be established by processing unit 306 based on similar information received or otherwise gathered from SPS interface 304.

Such selection information 320 may be considered along with selection criteria 322, for example, to determine when to adapt a receiver 112 per a mode 340. For example, selection criteria 322 may include information associated with one or more thresholds that if satisfied by selection information 320, may lead processing unit 304 to adapt a receiver 112 per a mode 340. For example, selection criteria 322 may include a threshold 324 corresponding to a signal having been received, corresponding to a signal strength of a received signal, corresponding to a signal quality of a received signal, corresponding to a number of satellites or the like from which signals have been received, and/or corresponding to other like information.

SPS interface 304 may, for example, include a plurality of receivers 112-1, 112-2, . . . , 112-z. As illustrated in FIG. 3, for example, receiver 112-1 may include an adaptable receiver path 330-1 and a digital baseband processor 332-1, one or more of which may be selectively enabled to receive a signal associated with an SPS per a mode 340-1. Similarly, receiver 112-2 may, for example, include an adaptable receiver path 330-2 and a digital baseband processor 332-2, one or more of which may be selectively enabled to receive a signal associated with an SPS per a mode 340-2, and receiver 112-z may include an adaptable receiver path 330-z and a digital baseband processor 332-z, one or more of which may be selectively enabled to receive a signal associated with an SPS per a mode 340-z. While in this example, receivers 112-1, 112-2, . . . , 112-z are illustrated as being independent, it is recognized that in other implementations two or more of receivers may be combined in some manner and/or share certain components and/or circuitry. For example, in certain implementations, all or part of the digital baseband processing or other signal processing may be combined or share components (e.g., processors, memory, etc.).

As further illustrated in FIG. 3, SPS interface 304 may, for example, be operatively coupled to a position locator 360. Here, position locator 360 may be enabled to determine position location information based, at least in part, on one or more of the signals received by SPS interface 304. In certain implementations, position locator 360 may be enabled to determine position location information based on position location information already determined by one or more of receivers 112. Thus, depending on the design, the requisite processing of received signals, for example to determine navigation information, may occur in receivers 112 and/or in position locator 360. In certain implementations, for example, position locator 360 may be enabled to provide improved navigation information or the like by considering a plurality of received signals and/or various determined navigation information that may be associated with more than one SPS, more than one receiver, more than one antenna, and/or more than one frequency, frequency band and/or frequency channel.

Position locator 360 may, for example, be further enabled to provide information to controller 302. For example, operating mode related information, selection related information, and/or selection criteria related information may be provided to processing unit 306, which may consider such information to establish or otherwise affect one or more of first mode 310, second mode 312, . . . , $n^{th}$ mode 314, selection information 320, selection criteria 322, and/or threshold 324.

The information and/or instructions that may, for example, be stored in memory 308 and/or that may be operatively associated with processing unit 306 (or other subsystems within device 102) may be provided by a computer readable medium 326. Computer readable medium 326 (e.g., computer readable media) may, for example, include an object that may be selectively coupled to controller 302 or other like subsystem of device 102.

As used herein the term "memory" refers to any type of long term, short term, volatile, nonvolatile, or other memory and is not to be limited to any particular type of memory or number of memories, or type of media upon which information may be stored.

In certain exemplary implementations, the functions described herein may be implemented in hardware, software, firmware, or any combination thereof. If implemented in software, the functions may be stored on or transmitted over as one or more instructions or code on a computer readable medium. Computer readable media includes both computer storage media and communication media including any medium that facilitates transfer of a computer program from one place to another. A storage media may be any available media that can be accessed by a computer.

By way of example, and not limitation, such computer readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Furthermore, any connection may be properly termed a computer readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of a computer readable medium.

Figure 4:
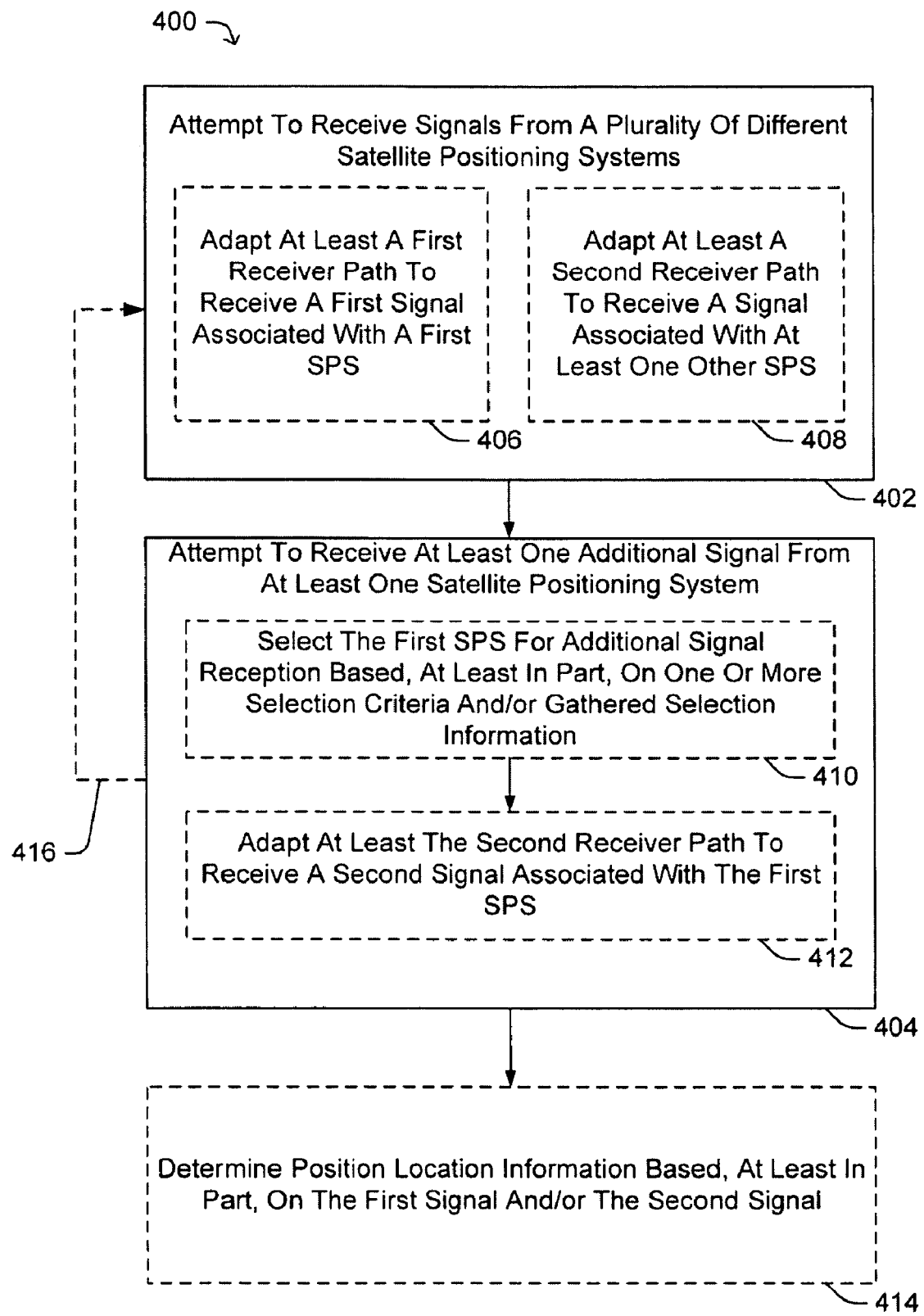
FIG. 4 is a flow diagram illustrating a method or process that may, for example, be implemented in the environment of FIG. 1.

Reference is now made to FIG. 4, which includes a flow diagram illustrating a method 400 that may be implemented in device 102, for example.

At block 402, device 102 may attempt to receive signals from a plurality of different satellite positioning systems. For example, block 402 may include at block 406 enabling at least a first receiver path to receive a first signal associated with a first SPS, and at block 408 enabling at least a second receiver path to receive a signal associated with at least one other SPS. Block 402 may include gathering or otherwise establishing selection related information and/or selection criteria related information associated with the attempted signal reception. Some exemplary implementations of block 402 are provided below with reference to FIG. 5, which illustrates some adaptable receiver paths and/or components therein.

At block 404, device 102 may attempt to receive at least one additional signal from at least one satellite positioning system. Here, for example, at block 410 the first SPS may be selected for additional attempted signal reception based, at least in part, on one or more selection criteria and/or selection information. At block 412, in response to the selection at block 410 at least the second receiver path may be enabled to receive a second signal associated with the first SPS. In certain implementations the second signal may be a differently received version of the same signal as the first signal (e.g., multipath). In other implementations the second signal may be associated with a different frequency, frequency band, and/or frequency channel than that which may be associated with the first signal. Some exemplary implementations of block 404 are provided below with reference to FIG. 5, which illustrates some adaptable receiver paths and/or components therein.

As illustrated by arrow 416, all or portions of blocks 402 and then 404 may, for example, be repeated in some manner such that the device is configured to continually or periodically monitor the wireless environment and possible adapt one or more receivers based, at least in part, on more recently gathered selection information and/or selection criteria.

In certain implementations, one or more of the receivers may, for example, be enabled at block 402 and/or 404 according to an operating mode selected from a plurality of operating modes. Such operating modes may, for example, be associated with different SPS, different frequencies, different frequency bands, different frequency channels, different locations, specific times, etc. Specific operating modes or groups of operating modes may be associated with an initialization, start-up, and/or other like process that may, for example, allow the device to perform various types of searches.

At block 414, position location information may be determined based, at least in part, on at least the first signal (block 406) and/or the second signal (block 412). For example, position location information may be determined using techniques, such as, triangulation, trilateration, and/or the like. The location position information determined at block 414 may provide for a high level of accuracy and/or reliability as a result of method 400 and in particular, having received a plurality of signals from one or more SPS per blocks 402 and/or 404, and possibly having enabled more than once to the wireless environment per arrow 416.

The methods and apparatuses provided herein may, for example, prove beneficial for any device that may be configured to determine or assist in determining a position location. For many such devices, a yield (e.g., fraction of time that a position fix may be obtained) and a time-to-first-fix (TTFF) may be important considerations with regard to the performance and/or usefulness of the device. To improve and possibly optimize these exemplary parameters, the methods and apparatuses presented herein may take advantage of signals from as many satellites as possible, including at times signals from a variety of different SPS. For example, signals associate with different GNSS, such as GPS, Galileo, and/or Glonass, and/or certain wireless systems/networks (e.g., cellular networks, etc.) may be received and processed in determining position location information. Further, for a given SPS additional accuracy and/or reliability may be provided when additional signals are received, for example, such as signals associated with different frequencies, frequency bands, and/or frequency channels. By way of example but not limitation, signals may be received by different receivers enabled to the L1, L2 and/or L5 bands associated with GPS, and/or possibly the L1 and E5A bands associated with Galileo.

In certain implementations the methods and apparatuses provided herein may, for example, provide robust navigation capabilities by receiving signals over multiple frequencies in an environment that may, for example, include multiple path signal transmissions and/or other signal interferences.

Figure 5:
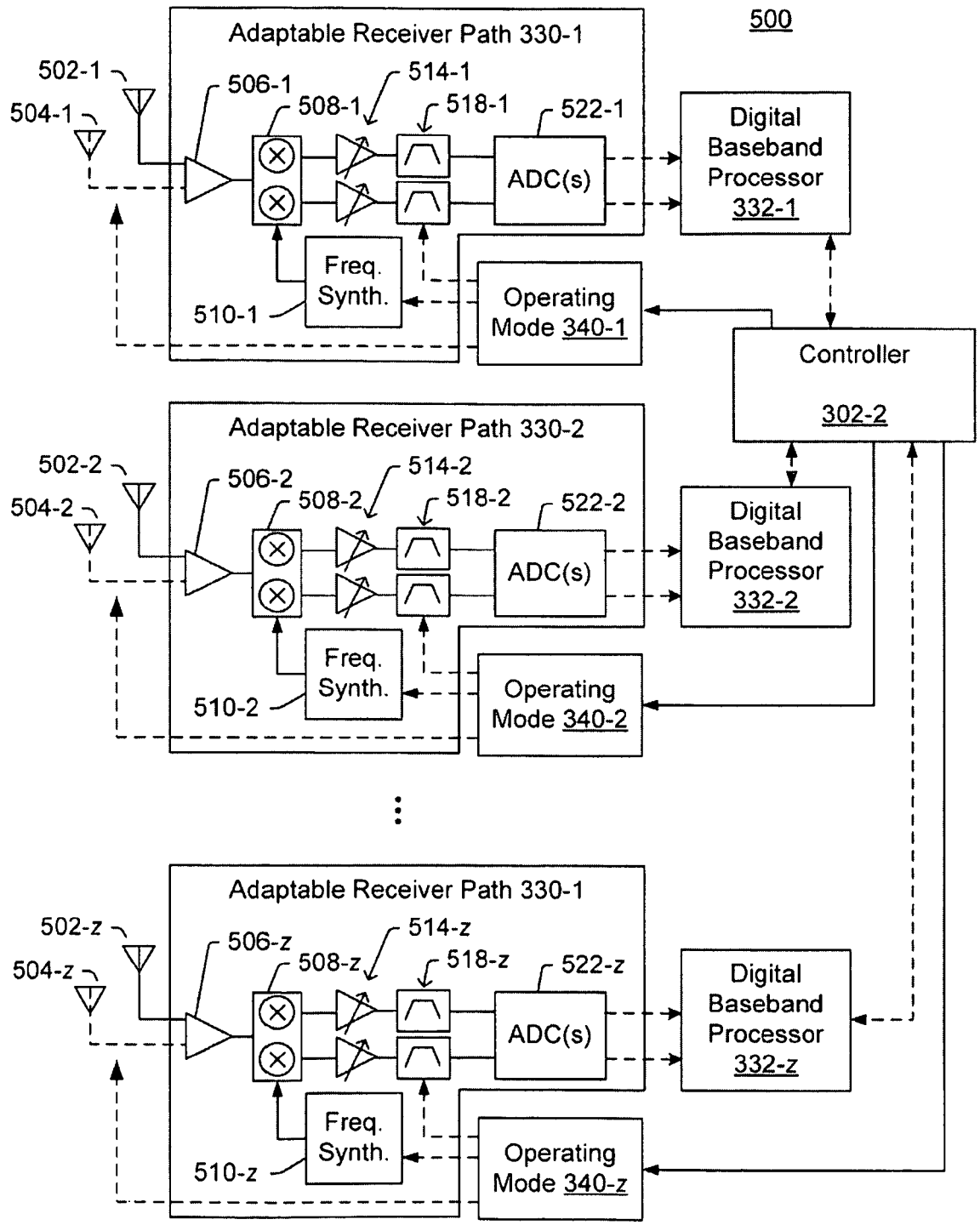
FIG. 5 is a schematic diagram illustrating certain features of an exemplary apparatus having a plurality of adaptable receiver paths that may, for example, be implemented in the device of FIG. 1.

Attention is now drawn to FIG. 5, which is a block diagram illustrating an apparatus 500 that may be implemented in device 102 of FIGS. 1 and 3, for example. Here, certain exemplary components are shown within a plurality of adaptable receiver paths 330-1, 330-2, . . . , 330-z that may be selectively enabled or otherwise affected by a controller 302-2 per an operating mode 340-1, 340-2, . . . , 340-z, respectively. As illustrated in FIG. 5, adaptable receiver paths 330-1, 330-2, . . . , 330-z may be operatively coupled to corresponding digital baseband processors 332-1, 332-2, . . . , 332-z, respectively. In certain implementations, one or more of the adaptable receiver paths and/or digital baseband processors may, for example, be combined and/or share certain components and/or circuitry with one or more other such subsystems. Further, in certain implementations, one or more of the illustrated components and/or subsystems of apparatus 500 may, for example, be included in a different or possibly added to a new subsystem. For example, antennas 502 and 504 while illustrated as being outside of the adaptable receiver paths may be included in such adaptable receiver paths in certain implementations.

Adaptable receiver path 330-1, in this exemplary implementation, may include an amplifier 506-1 that may be coupled to an output of at least one antenna 502-1. Amplifier 506-1 may, for example, include a low noise amplifier or the like, that is configured to amplify the signals received and output by at least antenna 502-1. Amplifier 506-1 may, for example, be coupled to or selectively coupled to the output of one or more other antennas as represented here by antenna 504-1. For example, the signal from antenna 502-1 may be amplified by amplifier 506-1 per an operating mode (340-1), while the signal from antenna 504-1 is not so amplified. Subsequently, if the operating mode changes, then the signal from antenna 504-1 may be amplified by amplifier 506-1, while the signal from antenna 502-1 is not amplified. In other implementations, antennas 502-1 and/or 504-1 may represent an adaptable or other like antenna that may be selectively enabled in some manner, for example, based at least in part on operating mode 340-1. For example, antenna 502-1 and/or 504-1 may be tuned to a particular frequency, frequency band, and/or frequency channel per operating mode 340-1.

The output(s) from amplifier 506-1 may be coupled to the input of a mixer 508-1. Mixer 508-1 may, for example, be configured to covert the signal(s) from amplifier 506-1 based on one or more signals provided by a frequency synthesizer 510-1. Frequency synthesizer 510-1 may, for example, include a programmable frequency synthesizer that is responsive, at least in part, to operating mode 340-1 such that adaptable receiver path 330-1 is enabled to receive signals associated with a selected frequency, frequency band, and/or frequency channel. Here, for example frequency synthesizer 510-1 may be enabled per operating mode 340-1 to generate a local oscillator frequency that may be provided to mixer 508-1.

The output(s) from mixer 508-1 may be coupled to an input(s) of a gain block 514-1, which may be configured to amplify the converted signal(s) from mixer 508-1. The output(s) of gain block 514-1 may be coupled to an input(s) of a filter 518-1. Filter 518-1 may, for example, include a low-pass filter or the like, or a programmable band pass filter (real or complex) that may be selectively enabled per operating mode 340-1 such that adaptable receiver path 330-1 is enabled to receive signals associated with a selected frequency, frequency band, and/or frequency channel.

The output(s) of filter 518-1 may be coupled to an input of one or more analog to digital converter(s) represented by ADC 522-1. ADC 522-1 may, for example, be configured to sample the analog signal(s) output by filter 518-1 and generate a corresponding digital signal(s). The resulting digital signal(s) from ADC 522-1 may, for example, be provided to or otherwise accessed by digital baseband processor 332-1.

Digital baseband processor 332-1 may, for example, be configured to process the resulting digital signal to further correlate, acquire, and/or otherwise determine information that may be associated with and communicated via the original corresponding wireless signal as transmitted by an SPS resource (e.g., a satellite) and received by at least one of antennas 502-1 and/or 504-1. For example, digital baseband processor 332-2 may be configured to determine navigation information in support of a position location process associated with a particular GNSS. Controller 302-2 may, for example, be coupled to digital baseband processor 332-1 such that selection related information, selection criteria related information, and/or other like information associated with the received signal(s), the GNSS, and/or position location process may be considered, at least in part, by controller 302-2. For example, controller 302-2 may take into account information from digital baseband processor 332-1 regarding a number of satellites acquired, signal strength, signal quality, or other like information in selecting operating mode 340-1 and/or other operating modes such as operating mode 340-2 which may selectively adapt adaptable receiver path 330-2.

Adaptable receiver paths 330-2 . . . , 330-z, in this exemplary implementation, may be of the same or similar design as adaptable receiver path 330-1. Thus, for example, adaptable receiver paths 330-2, . . . -z, may, respectively, include amplifiers 506-2, . . . -z which may be coupled to an output of at least one antenna 502-2, . . . -z. Amplifiers 506-2, . . . -z may, for example, include a low noise amplifiers or the like, that are configured to amplify the signals received and output by at least antenna 502-2, . . . -z, respectively. Amplifiers 506-2, . . . -z may, for example, be coupled to or selectively coupled to the outputs of one or more other antennas as represented here, respectively, by antennas 504-2, . . . -z. For example, signals from antenna 502-2, . . . -z may be amplified by amplifiers 506-2, . . . -z, respectively, per applicable operating modes 340-2, . . . -z. For example, antenna 502-2 and/or 504-2 may be tuned to a particular frequency, frequency band, and/or frequency channel per operating mode 340-2.

Amplifiers 506-2, . . . -z may be coupled to mixers 508-2, . . . -z, respectively. Mixers 508-2, . . . -z may, for example, be configured to covert the signal(s) from amplifiers 506-2, . . . -z, respectively, based on one or more signals provided by frequency synthesizers 510-2, . . . -z, again respectively. Frequency synthesizers 510-2, . . . -z may, for example, include programmable frequency synthesizers that are responsive, at least in part, to operating modes 340-2, . . . -z, respectively.

Mixers 508-2, . . . -z may be coupled to gain blocks 514-2, . . . -z, respectively. Gain blocks 514-2, . . . -z may be coupled to filters 518-2, . . . -z, respectively. Filters 518-2, . . . -z may be coupled to ADCs 522-2, . . . -z, respectively, and ADCs 522-2, . . . -z may generate corresponding digital signal(s) that may then be provided to. The resulting digital signal(s) from ADC 522-2, . . . -z may, for example, by provided to or otherwise accessed by digital baseband processors 332-2, . . . -z, again respectively.

Digital baseband processors 332-2, . . . -z may, for example, be coupled to controller 302-2, for similar reasons as described above with regard to digital baseband processor 332-1.

As illustrated in the example of FIG. 5, one or more adaptable components and/or circuits may be provided in each receiver path and operatively enabled per an applicable operating mode. For example, a frequency synthesizer may be selectively enabled to generate certain frequencies as may be needed for use with different GNSS signals, a filter may be selectively enabled for a particular bandwidth and/or may be selectively enabled to be real or complex, and/or an ADC may be selectively enabled based on a particular sample rate and/or to provide a particular resolution. As such, apparatus 500 and hence device 102 may be selectively enabled as may be appropriate to receive and process various signals from one or more SPS. As illustrated in the examples herein, a controller may be configured to selectively adapt such components, for example, via certain operating modes.

The controller may, for example, be configured to determine operating modes that lead to configuration of the receiver paths to improve overall system performance. For example, the controller may select or establish operating modes that provide for a fast time-to-fix or high accuracy once a fix is obtained from a given GNSS.

An example of how apparatus 500 may be employed within a device may be as follows. If the device is turned on or started, it may be desirable to establish a position location fix as quickly as possible. This may include, for example, searching all or selected portions of available satellites as quickly as possible with as much parallel searching as possible. In this scenario, each receiver path may be selectively enabled to search different SPS until sufficient satellites have been detected, within at least one of the SPS, to determine a fix. Then, based on whichever system the first fix is obtained on, one or more other receiver paths may be selectively enabled to receive different frequencies within that SPS, which may, for example, provide for improved accuracy.

Continuing with this example, each receiver per its operating mode as selected or otherwise established by the controller may search for signals from the satellites within a respective SPS. As soon as a fix is obtained, additional receiver(s) may be reconfigured to search the same SPS for signals at different frequencies, frequency bands, and/or frequency channels. In certain implementations, the controller may, for example, configure certain receiver(s) to search for the same signal using different antennas. In certain implementations, one or more of the operating modes may lead a receiver or portions thereof to shut down for example, to reduce power consumption. Thus, if adequate signaling is received then a portion of the SPS interface may be "turned-off" or placed in a sleep configuration or the like. Conversely, an operating mode may "turn-on", awaken, or otherwise active a portion of the SPS interface.

In certain example implementations, a device may include detector circuitry 361 (see FIG. 3) and/or other like RF signal receiving circuitry that may detect and/or otherwise determine the presence of certain RF signals, such as blockers, jammers, and/or other like interferers. Here, for example, a controller may be enabled to respond to one or more of such RF environment factors 315 by configuring/reconfiguring one or more receivers in some manner as described herein. Thus, such a device may be dynamically responsive to identify (e.g., specify, access, establish, detect, determine, signal, etc.) one or more RF environment factors. Such RF environment factors are not necessarily limited to these examples, and may include any metric and/or quantity that may be associated with the RF environment. These are but a few examples to which claimed subject matter is not necessarily limited.

In certain example implementations, a controller may be enabled to determine when to operatively enable a receiver path to receive a different SPS signal based, at least in part, on a time-based parameter 317, a device mode parameter 319, and/or a received parameter 321 (see FIG. 3). For example, time-based parameter 317 may be associated with a timer, clock, and/or the like (not shown but which may, for example, be associated with, provided by, or separate from controller 302), that may identify or otherwise establish one or more transition times. Such transition times may be cyclic or may be sporadic. For example, device mode parameter 319 may be associated with one or more operating modes in which the device may be operated. Such operating modes may include, for example, an initialization mode (e.g., upon powering on), a normal operating mode, a device power mode, an enhanced navigation mode (e.g., an emergency positioning operation), a particular position resolution mode (e.g., when higher or lower positioning/navigation precision/resolution may be desired), another device function mode (e.g., associated with the device attending to another function that the device may perform), and/or other like device modes. For example, received parameter 321 may be received by the device from another device over a wired and/or wireless link (e.g., via wireless communication system 104). These are but a few examples to which claimed subject matter is not necessarily limited.

The methodologies described herein may be implemented by various means depending upon the application. For example, these methodologies may be implemented in hardware, firmware, software, or a combination thereof. For a hardware implementation, all or part of device 102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may, for example, be implemented with modules (e.g., procedures, functions, and so on) that perform the functions described herein. Any machine or computer readable medium tangibly embodying instructions may be used in implementing the methodologies described herein. For example, software codes or instructions and other data may be stored in memory, for example memory 310, and executed by processing unit 308 or other like circuits within device 102.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method comprising:
operatively enabling at least a first receiver path to receive a first signal associated with a first satellite positioning system (SPS);
operatively enabling at least a second receiver path to receive a signal associated with at least one other SPS; and
subsequently operatively enabling at least said second receiver path to receive a second signal associated with said first SPS.

2. The method as recited in claim 1, further comprising:
operatively enabling at least said second receiver path to receive said second SPS signal based, at least in part, on at least one RF environment factor.

3. The method as recited in claim 2, further comprising:
identifying said at least one RF environment factor.

4. The method as recited in claim 1, further comprising:
operatively enabling at least said second receiver path to receive said second SPS signal based, at least in part, on at least one of a time parameter, a device mode parameter, and/or a received parameter.

5. The method as recited in claim 1, further comprising:
operatively enabling at least said second receiver path to receive said second SPS signal based, at least in part, in response to receipt of information from at least a threshold number of satellites via said first signal.

6. The method as recited in claim 1, further comprising:
operatively enabling at least said second receiver path to receive said second signal based, at least in part, in response to receipt of said first signal of at least a threshold signal strength.

7. The method as recited in claim 1, further comprising:
operatively enabling at least said second receiver path to receive said second signal based, at least in part, in response to receipt of said first signal of at least a threshold signal quality and in response subsequently.

8. The method as recited in claim 1, wherein said first signal is associated with a first frequency band or first frequency channel, and said second signal is associated with a second frequency band or second frequency channel.

9. The method as recited in claim 1, wherein said first signal comprises a line of sight version and said second signal comprises a multipath version of one SPS signal.

10. The method as recited in claim 1, wherein operatively enabling said second receiver path to receive said second signal comprises:
selectively operatively enabling at least one adaptable component operatively associated with said second receiver path to receive said second signal.

11. The method as recited in claim 10, wherein said at least one adaptable component comprises at least one of an adaptable antenna, at least one selectable antenna, an adaptable filter, an adaptable synthesizer, and/or a baseband processor.

12. The method as recited in claim 1, wherein said first SPS comprises a first Global Satellite Navigation System (GNSS) and said at least one other SPS comprises a second GNSS different from said first GNSS.

13. The method as recited in claim 1, further comprising:
determining position location information based, at least in part, on at least one of said first signal and said second signal.

14. An apparatus comprising:
a plurality of receiver paths; and
a controller operatively coupled to said plurality of receiver paths and operatively enabled to: (i) operatively enable at least a first receiver path to receive a first signal associated with a first satellite positioning system (SPS), (ii) operatively enable at least a second receiver path to receive a signal associated with at least one other SPS, and (iii) selectively operatively enable at least said second receiver path to receive a second signal associated with said first SPS.

15. The apparatus as recited in claim 14, wherein said controller is enabled to operatively enable at least said second receiver path to receive said second SPS signal based, at least in part, on at least one RF environment factor.

16. The method as recited in claim 15, further comprising circuitry operatively coupled to said controller and enabled to identify said at least one RF environment factor.

17. The apparatus as recited in claim 14, wherein said controller is enabled to operatively enable at least said second receiver path to receive said second SPS signal based, at least in part, on at least one of a time parameter, a device mode parameter, and/or a received parameter.

18. The apparatus as recited in claim 14, wherein said controller is enabled to selectively operatively enable at least said second receiver path to receive said second signal based, at least in part, in response to receiving information from at least a threshold number of satellites via said first signal.

19. The apparatus as recited in claim 14, wherein said controller is operatively enabled to selectively adapt at least said second receiver path to receive said second signal based, at least in part, in response to receiving said first signal having at least a threshold signal strength.

20. The apparatus as recited in claim 14, wherein said controller is operatively enabled to selectively adapt at least said second receiver path to receive said second signal based, at least in part, in response to receiving said first signal having at least a threshold signal quality.

21. The apparatus as recited in claim 14, wherein said first signal is associated with a first frequency band or first frequency channel and said second signal is associated with a second frequency band or second frequency channel.

22. The apparatus as recited in claim 14, wherein said first signal comprises a line of sight version and said second signal comprises a multipath version of one SPS signal.

23. The apparatus as recited in claim 14, wherein at least said second receiver path is operatively associated with at least one of an adaptable antenna, at least one selectable antenna, an adaptable filter, an adaptable synthesizer, and/or a baseband processor.

24. The apparatus as recited in claim 14, wherein said first SPS comprises a first Global Satellite Navigation System (GNSS) and said at least one other SPS comprises a second GNSS different from said first GNSS.

25. The apparatus as recited in claim 14, further comprising:
a position locator operatively coupled to at least said plurality of receiver paths and operatively enabled to determine position location information based, at least in part, on at least one of said first signal and said second signal.

26. The apparatus as recited in claim 14, wherein at least said plurality of receiver paths and said controller are provided within a mobile device.

27. An apparatus comprising:
means for selectively receiving a first signal associated with a first satellite positioning system (SPS);
means for selectively receiving a signal associated with a second SPS;
means for selecting said first SPS over said second SPS based, at least in part, on said first signal and in response initiating said means for selectively receiving said signal associated with said second SPS to selectively receive a second signal associated with said first SPS.

28. The apparatus as recited in claim 27, wherein said means for selecting said first SPS over said second SPS is enabled to operatively enable at least said second receiver path to receive said second SPS signal based, at least in part, on at least one RF environment factor.

29. The apparatus as recited in claim 28, further comprising:
means for identifying said at least one RF environment factor.

30. The apparatus as recited in claim 27, wherein said means for selecting said first SPS over said second SPS is enabled to operatively enable at least said second receiver path to receive said second SPS signal based, at least in part, on at least one of a time parameter, a device mode parameter, and/or a received parameter.

31. The apparatus as recited in claim 27, wherein said means for selecting said first SPS over said second SPS is operatively enabled to determine if information from at least a threshold number of satellites has been received via said first signal before initiating said means for selectively receiving said signal associated with said second SPS to selectively receive said second SPS signal associated.

32. The apparatus as recited in claim 27, wherein said means for selecting said first SPS over said second SPS is operatively enabled to determine if said first signal has at least a threshold signal strength before initiating said means for selectively receiving said signal associated with said second SPS to selectively receive said second SPS signal associated.

33. The apparatus as recited in claim 27, wherein said means for selecting said first SPS over said second SPS is operatively enabled to determine if said first signal has at least a threshold signal quality before initiating said means for selectively receiving said signal associated with said second SPS to selectively receive said second SPS signal associated.

34. The apparatus as recited in claim 27, wherein said first signal is associated with a first frequency band or first frequency channel and said second signal is associated with a second frequency band or second frequency channel.

35. The apparatus as recited in claim 27, wherein said first SPS comprises a first Global Satellite Navigation System (GNSS) and said at least one other SPS comprises a second GNSS different from said first GNSS.

36. The apparatus as recited in claim 27, further comprising:
  means for determining position location information based, at least in part, on at least one of said first signal and said second signal.

37. An article comprising a computer readable medium having stored thereon computer implementable instructions which if implemented by one or more processing units operatively enable the one or more processing units to:
  (i) adapt at least a first receiver path to receive a first signal associated with a first satellite positioning system (SPS);
  (ii) adapt at least a second receiver path to receive a signal associated with at least one other SPS; and
  (iii) selectively adapt at least said second receiver path to receive a second signal associated with said first SPS.

38. The article as recited in claim 37, wherein said computer implementable instructions, if implemented by the one or more processing units operatively enable the one or more processing units to operatively enable at least said second receiver path to receive said second SPS signal based, at least in part, on at least one RF environment factor.

39. The article as recited in claim 38, wherein said computer implementable instructions, if implemented by the one or more processing units operatively enable the one or more processing units to access or receive said at least one RF environment factor.

40. The article as recited in claim 37, wherein said computer implementable instructions, if implemented by the one or more processing units operatively enable the one or more processing units to operatively enable at least said second receiver path to receive said second SPS signal based, at least in part, on at least one of a time parameter, a device mode parameter, and/or a received parameter.

41. The article as recited in claim 37, wherein said computer implementable instructions, if implemented by the one or more processing units operatively enable the one or more processing units to operatively enable at least said second receiver path to receive said second signal based, at least in part, in response to receiving information from at least a threshold number of satellites via said first signal.

42. The article as recited in claim 37, wherein said computer implementable instructions, if implemented by the one or more processing units operatively enable the one or more processing units to operatively enable at least said second receiver path to receive said second signal based, at least in part, in response to receiving said first signal having at least a threshold signal strength.

43. The article as recited in claim 37, wherein said computer implementable instructions, if implemented by the one or more processing units operatively enable the one or more processing units to operatively enable at least said second receiver path to receive said second signal based, at least in part, in response to receiving said first signal having at least a threshold signal quality.

44. The article as recited in claim 37, wherein said first signal is associated with a first frequency band or first frequency channel and said second signal is associated with a second frequency band or second frequency channel.

45. The article as recited in claim 37, wherein said first SPS comprises a first Global Satellite Navigation System (GNSS) and said at least one other SPS comprises a different GNSS.

46. The method as recited in claim 1, further comprising:
  operatively enabling at least said second receiver path to receive said second SPS signal based, at least in part, on position location information.

* * * * *